US012421081B2

(12) United States Patent
Kattainen et al.

(10) Patent No.: US 12,421,081 B2
(45) Date of Patent: Sep. 23, 2025

(54) METHOD AND AN ELEVATOR SYSTEM FOR DEFINING AN ELONGATION OF AN ELEVATOR CAR SUSPENSION DEVICE

(71) Applicant: Kone Corporation, Helsinki (FI)

(72) Inventors: Ari Kattainen, Helsinki (FI); Antti Hovi, Helsinki (FI)

(73) Assignee: Kone Corporation, Helsinki (FI)

( * ) Notice: Subject to any disclaimer, the term of this patent is extended or adjusted under 35 U.S.C. 154(b) by 1591 days.

(21) Appl. No.: 16/789,969

(22) Filed: Feb. 13, 2020

(65) Prior Publication Data

US 2020/0180910 A1 Jun. 11, 2020

Related U.S. Application Data

(63) Continuation of application No. PCT/FI2018/050439, filed on Jun. 12, 2018.

(30) Foreign Application Priority Data

Sep. 28, 2017 (WO) .................. PCT/FI2017/050685

(51) Int. Cl.
*B66B 7/12* (2006.01)
*B66B 5/00* (2006.01)
(Continued)

(52) U.S. Cl.
CPC .......... *B66B 7/1215* (2013.01); *B66B 5/0025* (2013.01); *B66B 5/02* (2013.01); *B66B 5/12* (2013.01)

(58) Field of Classification Search
CPC ........... B66B 5/02; B66B 5/0031; B66B 7/06; B66B 7/10; B66B 11/008; B66B 1/3492; B66B 7/1215; B66B 1/44; B66B 1/3476; B66B 11/009; B66B 11/043; B66B 3/02; B66B 5/0006; B66B 5/0068; B66B 5/021; B66B 7/068; B66B 11/0075; B66B 11/0476; B66B 9/083; B66B 1/34–3423;
(Continued)

(56) References Cited

U.S. PATENT DOCUMENTS

2015/0059195 A1 3/2015 De Coi et al.
2017/0022028 A1 1/2017 Cortona et al.

FOREIGN PATENT DOCUMENTS

CN 111132921 A * 5/2020 ........... B66B 5/0031
EP 0619263 A2 10/1994
(Continued)

OTHER PUBLICATIONS

International Search Report PCT/ISA/210 for International Application No. PCT/FI2018/050439 Dated Oct. 23, 2018.
(Continued)

*Primary Examiner* — Christopher Uhlir
(74) *Attorney, Agent, or Firm* — Harness, Dickey & Pierce, P.L.C.

(57) ABSTRACT

The invention relates to a method for defining elongation of an elevator car suspension means. The method comprises: obtaining periodically a value representing an overtravel distance of the elevator car, and defining the elongation of the elevator car suspension means on a basis of the periodically obtained values representing the overtravel distance of the elevator car. The invention relates also to an elevator system performing at least partly the method.

18 Claims, 6 Drawing Sheets

(51) Int. Cl.
*B66B 5/02* (2006.01)
*B66B 5/12* (2006.01)

(58) Field of Classification Search
CPC .......... B66B 1/3446–3469; B66B 1/36; B66B 1/365; B66B 1/48; B66B 5/00; B66B 5/0018–0037; B66B 5/0087; B66B 5/12; B66B 5/125; B66B 5/28; B66B 5/288; B66B 7/12–1238; B66B 11/0005
See application file for complete search history.

(56) References Cited

FOREIGN PATENT DOCUMENTS

| | | | | | |
|---|---|---|---|---|---|
| EP | 2676915 | A1 | | 12/2013 | |
| JP | 2008019039 | A | | 1/2008 | |
| JP | 2002504471 | A | * | 5/2020 | |
| WO | WO-2014128347 | A1 | * | 8/2014 | ............... B66B 1/24 |
| WO | WO-2019063873 | A1 | * | 4/2019 | ............... B66B 1/24 |
| WO | WO-2019066856 | A1 | * | 4/2019 | ........... B66B 5/0031 |

OTHER PUBLICATIONS

Written Opinion of the International Searching Authority PCT/ISA/237 for International Application No. PCT/FI2018/050439 dated Oct. 23, 2018.

* cited by examiner

METHOD AND AN ELEVATOR SYSTEM FOR DEFINING AN ELONGATION OF AN ELEVATOR CAR SUSPENSION DEVICE

CROSS-REFERENCE TO RELATED APPLICATION

This application is a continuation of PCT International Application No. PCT/FI2018/050439 which has an International filing date of Jun. 12, 2018, and which claims priority to PCT International Application No. PCT/FI2017/050685 filed Sep. 28, 2017, the entire contents of both of which are incorporated herein by reference.

TECHNICAL FIELD

The invention concerns in general the technical field of elevators. Especially the invention concerns safety of elevators.

BACKGROUND

Typically an elevator system comprises an elevator car and a hoisting machine configured to drive the elevator car in an elevator shaft between floors. Furthermore, the elevator system comprises suspension means, such as a rope or a belt, for carrying, i.e. suspending the elevator car and a counterweight. For example, the elevator car may be arranged to one end of the elevator car suspension means and a counterweight may be arranged to the other end of the elevator car suspension means. Alternatively, the elevator car and the counterweight may be suspended with the elevator car suspension means by means of one or more diverter pulleys. Furthermore, the elevator system may comprise a final limit switch arranged to the elevator shaft within a door zone above the top floor. The final limit switch is configured to stop the movement of the elevator car in either direction, if the elevator car reaches an operating point of the final limit switch.

When the elevator system is installed or the elevator car suspension means are replaced with new elevator car suspension means, the length of the elevator car suspension means may be adjusted so that when the elevator car is at the top floor, the counterweight is configured to be a predefined overtravel distance from a buffer of the counterweight arranged at the bottom of the elevator shaft.

During the use of the elevator, the elevator suspension means elongates. Typically, the elevator suspension means elongate strongly, when they are new. After that the elongation stabilizes and remains substantially small until the lifetime of the rope or belt approaches to the end and the elongation of the rope or belt starts to increase again.

According to elevator safety regulations the final limit switch shall actuate, i.e. stop the movement of the elevator car, before the counterweight comes into contact with the buffer. When elevator suspension means have elongated so that the final limit switch does not stop the movement of the elevator car before the counterweight comes into contact with the buffer, the elevator does not fulfill the elevator safety requirements and it should be taken out of operation. In that case the counterweight comes into contact with the buffer before the final limit switch actuates. The elevator suspension means may be shortened so that the safety regulations are fulfilled again.

According to one prior art solution the operation of the final limit switch and a mechanical safety device is monitored and if it is detected that the operation of the final limit switch or the operation of the mechanical safety device do not fulfill the regulations anymore, the elevator is taken out of the operation. At least one disadvantage of the prior art solution is that the failure in the operation of the final limit switch is not detected until the elevator is required to be taken out of the operation.

SUMMARY

An objective of the invention is to present a method and elevator system for defining an elongation of an elevator car suspension means. Another objective of the invention is that the method and elevator system for defining an elongation of an elevator car suspension means improve at least partly the safety of the elevators.

The objectives of the invention are reached by a method and an elevator system as defined by the respective independent claims.

According to a first aspect, a method for defining elongation of an elevator car suspension means is provided, wherein the method comprises: obtaining periodically a value representing an overtravel distance of the elevator car, and defining the elongation of the elevator car suspension means on a basis of the periodically obtained values representing the overtravel distance of the elevator car.

The method may further comprise: defining a longtime trend of the overtravel distance on a basis of the periodically obtained values representing the overtravel distance, and defining a suitable moment for adjusting the length of the elevator car suspension means on a basis of the defined longtime trend.

Moreover, the method may further comprise defining the longtime trend on a basis of at least one elevator type specific parameter of said elevator together with the periodically obtained values representing the overtravel distance, wherein the at least one elevator type specific parameter may be at least one of the following: operating distance of a final limit switch, travel height, suspension ratio, load, number of ropes, type of ropes.

Alternatively or in addition, the method may comprise generating a first signal indicating a need for adjusting the length of the elevator car suspension means for an elevator service unit, in response to a detection that the periodically obtained value representing the overtravel distance meets a predefined first limit for the overtravel distance.

Moreover, the method may further comprise generating a second signal comprising an instruction to take the elevator car out of service for an elevator control unit, in response to a detection of that the periodically obtained value representing the overtravel distance meets a predefined second limit for the overtravel distance.

The value representing the overtravel distance may obtained by overcoupling a final limit switch arranged to the elevator shaft above the top floor; driving the elevator car upwards from a top floor until a counterweight comes into a contact with a buffer; and obtaining a distance travelled by the elevator car from the top floor up to a detection of an indication that the counterweight comes into a contact with the buffer, wherein said distance corresponds to the value representing the overtravel distance of the elevator car.

The indication may be detected by means of one of the following: detection of a change in a torque of a hoisting motor, detection of a movement of the buffer by means of a switch arranged to the buffer.

The method may further comprise: obtaining periodically a value representing settling of an elevator shaft, and defining the elongation of the elevator car suspension means on a basis of the periodically obtained values representing the overtravel distance of the elevator car and the periodically obtained values representing the settling of the elevator shaft, wherein the value representing the settling of the elevator shaft may be obtained by measuring the distance between top of the elevator shaft and a counterweight by means of a long-range distance meter, when the counterweight locates at a predefined reference location.

Alternatively or in addition, the method may further comprise obtaining an operating distance of a final limit switch in order to verify actual operating position of the final limit switch.

According to a second aspect, an elevator system for defining elongation of an elevator car suspension means is provided, the elevator system comprises: an elevator car, an elevator suspension means for carrying the elevator car, an elevator service unit, and an elevator safety control unit, wherein the elevator safety control unit is configured to obtain periodically a value representing an overtravel distance of the elevator car, and wherein the elevator safety control unit or the elevator service unit is configured to define the elongation of the elevator car suspension means on a basis of the periodically obtained values representing the overtravel distance of the elevator car.

The elevator safety control unit or the elevator service unit may further be configured to: define a longtime trend of the overtravel distance on a basis of the periodically obtained value representing the overtravel distance, and define a suitable moment for adjusting the length of the elevator car suspension means on a basis of the defined longtime trend.

Moreover, the elevator safety control unit or the elevator service unit may further be configured to define the longtime trend on a basis of at least one elevator type specific parameter of said elevator together with the periodically obtained values representing the overtravel distance, wherein the at least one elevator type specific parameter may be at least one of the following: operating distance of a final limit switch, travel height, suspension ratio, load, number of ropes, type of ropes.

Alternatively or in addition, the elevator safety control unit may be configured to generate a first signal comprising an instruction to take the elevator car out of service for an elevator control unit, in response to a detection that the obtained value representing the overtravel distance meets a predefined second limit for the overtravel distance.

Moreover, the elevator safety control unit may further be configured to generate a second signal comprising an instruction to take the elevator car out of service for an elevator control unit, in response to a detection that the obtained value representing the overtravel distance meets a predefined second limit for the overtravel distance.

The value representing the overtravel distance may be obtained by: overcoupling a final limit switch arranged to the elevator shaft above the top floor; driving the elevator car upwards from a top floor until a counterweight comes into a contact with a buffer; and obtaining a distance travelled by the elevator car from the top floor up to a detection of an indication that the counterweight comes into a contact with the buffer, wherein said distance corresponds to the value representing the overtravel distance of the elevator car.

The indication may be detected by means of one of the following: detection of a change in a torque of a hoisting motor, detection of a movement of the buffer by means of a switch arranged to the buffer.

The elevator safety control unit may further be configured to obtain periodically a value representing settling of an elevator shaft, wherein the elevator safety control unit or the elevator service unit may be configured to define the elongation of the elevator car suspension means on a basis of the periodically obtained values representing the overtravel distance of the elevator car and the periodically obtained values representing the settling of the elevator shaft, and wherein the system may comprise a long-range distance meter arranged to a top of the elevator shaft and configured to provide the value representing the settling of the elevator shaft by measuring the distance between top of the elevator shaft and a counterweight, when the counterweight locates at a predefined reference location.

Alternatively or in addition, the elevator safety control unit may further be configured to obtain an operating distance of a final limit switch in order to verify actual operating position of the final limit switch.

The exemplary embodiments of the invention presented in this patent application are not to be interpreted to pose limitations to the applicability of the appended claims. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objectives and advantages thereof, will be best understood from the following description of specific embodiments when read in connection with the accompanying drawings.

BRIEF DESCRIPTION OF FIGURES

The embodiments of the invention are illustrated by way of example, and not by way of limitation, in the figures of the accompanying drawings.

DESCRIPTION OF SOME EMBODIMENTS

Figure 1:
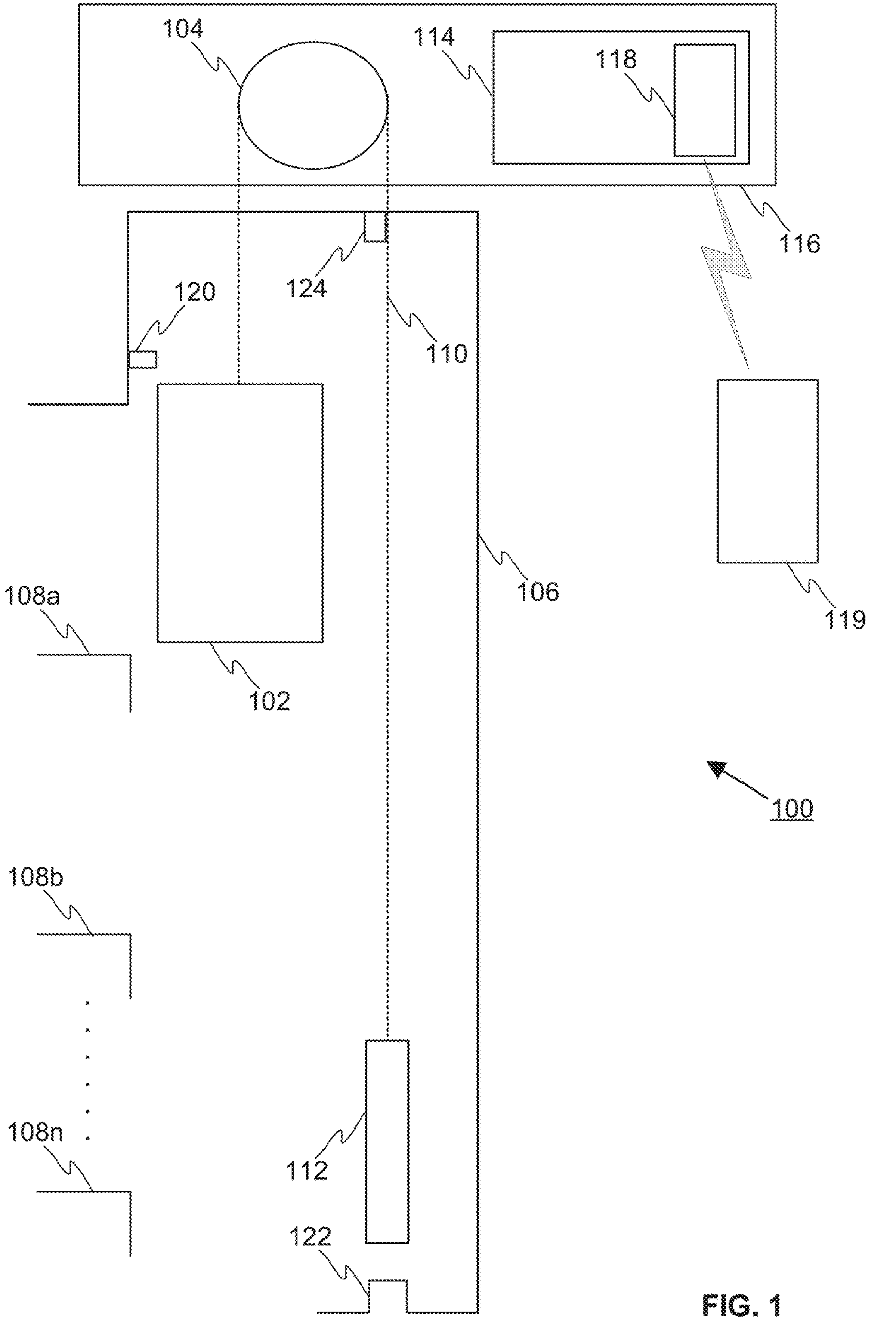
FIG. 1 illustrates schematically an example of an elevator system according to the invention.

FIG. 1 illustrates schematically an example of an elevator system 100 according to the invention, wherein the embodiments of the invention may be implemented as will be described. The elevator system 100 may comprise an elevator car 102 and a hoisting machine 104 configured to drive the elevator car 102 in an elevator shaft 106 between floors 108*a*-108*n*, i.e. landings. Furthermore, the elevator system 100 may comprise suspension means 110 for carrying, i.e. suspending the elevator car 102 and a counterweight 112. The suspension means 110 may be at least one of the following: rope, belt. A belt may comprise a plurality of ropes travelling inside the belt. Furthermore, the ropes may be coated for example with a polyurethane coating. In order to carry the elevator car 102 the elevator suspension means may be arranged to pass from the elevator car 102 over a pulley of the hoisting machine 104 to the counterweight 112. For example, the elevator car 102 may be arranged to one end of the elevator car suspension means 110 and the counterweight 112 may be arranged to the other end of the elevator car suspension means 110. Alternatively, the elevator car 102 and the counterweight 112 may be suspended with the elevator car suspension means 110 by means of one or more diverter pulleys. The counterweight 112 may be a metal tank with a ballast of weight approximately 40-50 percent of the weight of a fully loaded elevator car 102.

The elevator system 100 according to the invention may further comprise an elevator control unit 114 that may be configured to control the operation of the elevator system 100. The elevator control unit 114 may reside in a machine room 116. According to one embodiment a safety control unit 118 according to the invention may be implemented as a part of the elevator control unit 114 as illustrated in FIG. 1. According to another embodiment the safety control unit 118 may be implemented as a separate unit.

The elevator system 100 according to the invention may further comprise an external elevator service unit 119 that may be communicatively coupled to the elevator safety control unit 118. The communication between the elevator safety control unit 118 and the elevator service unit 119 may be based on one or more known communication technologies, either wired or wireless. The elevator service unit 119 may be for example a service center, service company or similar.

Furthermore, the elevator system 100 according to the invention may comprise a final limit switch 120 arranged to the elevator shaft 106 within a door zone above the top floor 108*a*. The final limit switch 120 may be configured to stop the movement of the elevator car 102 in either direction, if the elevator car 102 reaches an operating point of the final limit switch 120.

Figure 2:
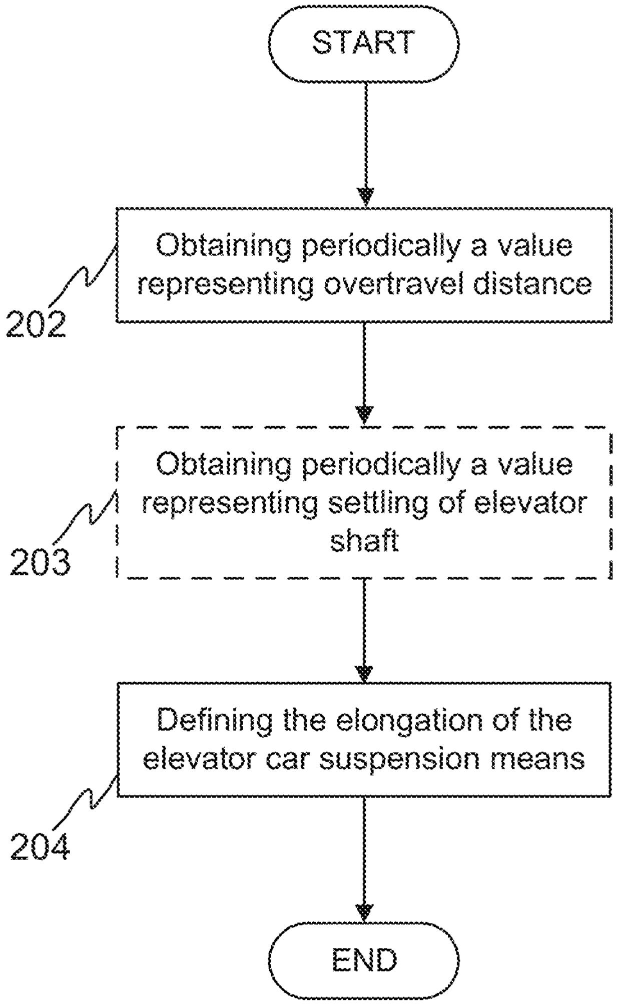
FIG. 2 illustrates schematically an example of a method according to the invention.

The method according to the invention enables defining elongation of an elevator car suspension means 110 by monitoring an overtravel distance of the elevator car 102. Next an example of a method according to the invention is described by referring to FIG. 2. FIG. 2 schematically illustrates the invention as a flow chart. The elevator safety control unit 118 obtains 202 periodically a value representing the overtravel distance of the elevator car 102. The elevator safety control unit 118 may define 204 the elongation of the elevator car suspension means 110 on a basis of the periodically obtained values representing the overtravel distance of the elevator car 102. The change of the overtravel distance may be considered to be substantially directly proportional to the elongation of the elevator car suspension means 110.

However, in case of an elevator of a newly built building, the overtravel distance may also change because of the settling of the building after the construction. Especially buildings made of concrete suffer from settling. The settling of the building occurs mainly during the first year of the building. The settling of the building causes also settling of the elevator shaft 106 arranged inside the building. The settling of the elevator shaft 106, in turn, may cause bending or compression of guide rails that are mounted in the elevator shaft 106 to guide the travel of the elevator car 102. The guide rails may be mounted, for example to the walls of the elevator shaft 106. In order to avoid the bending of the guide rails because of the settling of the elevator shaft, the guide rails are adjusted, i.e. remounted to the elevator shaft 106. By measuring the settling of the building, the remounting points of the guide rails may be defined. The settling may be defined by measuring distance between the top of the elevator shaft 106 and the counterweight 112.

In order to take into account the settling, the elevator safety control unit 118 obtains 203 periodically a value representing settling of the elevator shaft 106. The elevator system 100 may comprise a long-range distance meter 124 arranged at the top of the elevator shaft 106 to provide the value representing the settling of the elevator shaft 106. The long-range distance meter 124 may be arranged for example to the machine room 116 or to the ceiling of the elevator shaft 106. The long-range distance meter 124 may be for example a laser or Ultra Wideband (UWB) radio. When the counterweight 112 locates at a predefined reference location, the long-range distance meter 124 may be used to measure the distance between the top of the elevator shaft 106 and the counterweight 112. The measured distance is compared to an initial distance between the top of the elevator shaft 106 and the counterweight 112 measured, when the elevator system 100 is installed, and the difference between the measured distance and the initial distance corresponds to the settling of the elevator shaft 106. The predefined reference location of the counterweight 112 may be for example the location, where the counterweight 112 makes a contact with the buffer 122. The value representing the settling of the elevator shaft 106 may be obtained at regular or irregular intervals of time, i.e. the obtaining is repeated after a particular period of time. Alternatively or in addition, the value representing the settling of the elevator shaft 106 may be obtained every time, when the counterweight 112 locates at the reference position. Alternatively or in addition, the value representing the settling of the elevator shaft 106 may be obtained simultaneously with the overtravel distance measurement.

Moreover, in order to define the elongation of the elevator car suspension means 110 from the obtained overtravel distance, the portion caused by the settling of the building is removed from the obtained overtravel distance. As discussed above the settling of the building and the elevator shaft 106 occurs mainly during the first year of the building. Therefore, the measurement of the settling of the elevator shaft 106 is needed only until it may be noticed that the settling of the building and the elevator shaft 106 settles down, i.e. the settling of the building and the elevator shaft ends.

The defined elongation of the elevator car suspension means 110 may be an absolute value of the elongation of the elevator car suspension means 110 and/or rate of change of the elongation of the elevator car suspension means 110.

Alternatively or in addition, the elevator safety control unit 118 may communicate the obtained values to the elevator service unit 119 after the step 202 and the elevator service unit 119 may perform the step 204, i.e. define the elongation of the elevator car suspension means 110 on a basis of the periodically obtained values representing the overtravel distance of the elevator car 102. The communication between the elevator safety control unit 118 and the elevator service unit 119 may be continuous, i.e. real-time communication. Alternatively or in addition, the data, i.e. obtained overtravel distances and/or defined elongation of the elevator car suspension means 110, may be communicated from the elevator safety control unit 118 to the elevator service unit 119 according to a predefined time scheme. The communication of the data according to the predefined time scheme means that the data is not communicated continuously or in real-time. Instead the data may be communicated at a time instant, which the elevator safety control unit 118 or the elevator service unit 119 defines to be suitable for the communication. The suitable time instant may be for example one of the following: regular time interval, irregular time interval, when no data memory of the elevator safety control unit 118 is full or almost full.

In case of One to One (1:1) roping the change of the overtravel distance is directly proportional to the elongation of the elevator car suspension means 110. In 1:1 roping one end of elevator suspension means 110 passes from the elevator car 102 over the pulley, i.e. the traction sheave, of the hoisting machine 104, over the secondary or divertor sheave, and then to the counterweight 112. With 1:1 roping the elevator car 102, counterweight 112, and the elevator suspension means 110 all travel at the same speed. In case of any other ropings, such as 1:2 roping, the elongation of the elevator car suspension means 110 may be defined by taking into account also a suspension ratio of the elevator suspension means 110 in addition to the overtravel distance.

Figure 3A:
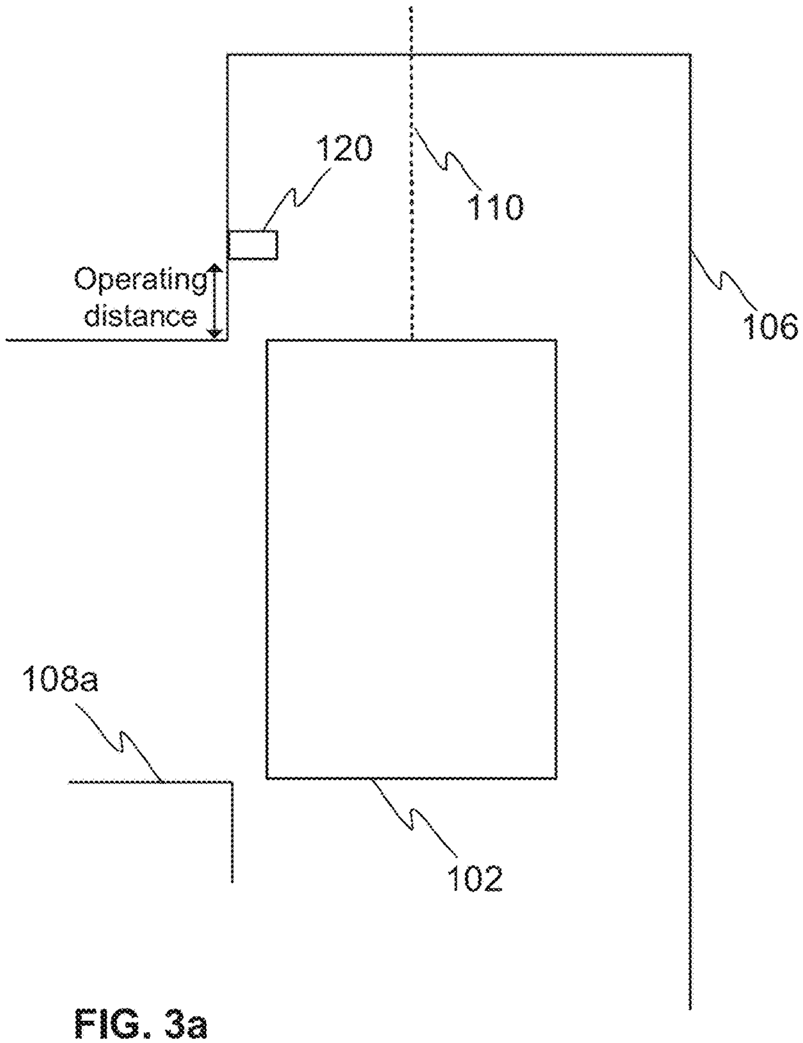
FIG. 3*a* illustrates schematically an example of an operating distance of a final limit switch of an elevator system according to the invention.
Figure 3B:
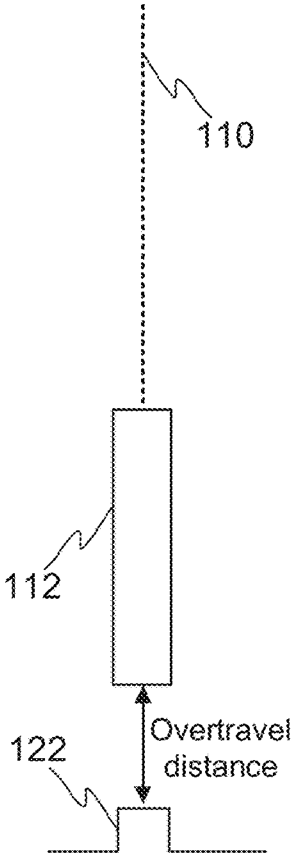
FIG. 3*b* illustrates schematically an example of an overtravel distance of an elevator car of an elevator system according to the invention.

When the elevator system is installed or the elevator car suspension means 110 are replaced with new elevator car suspension means 110, the length of the elevator car suspension means 110 is adjusted so that when the elevator car 102 is at the top floor 108*a* the counterweight 112 is configured to be a predefined overtravel distance, i.e. an initial value for the overtravel distance, from a buffer 122 of the counterweight 112 arranged at the bottom of the elevator shaft 106. The predefined overtravel distance may be defined so that the predefined overtravel distance is more than the operating distance of the final limit switch 120, i.e. the distance between the operating point of the final limit switch 120 and the roof level of the top floor 108*a*. If the predefined overtravel distance is equal or less than the operating distance of the final limit switch 120, the final limit switch 120 is not able to actuate, i.e. stop the movement of the elevator car 102, before the counterweight 112 comes into contact with the buffer 122. In that case the overtravel distance is less than the operating distance of the final limit switch 120 and the elevator safety regulations are not fulfilled. Furthermore, the operating distance of the final limit switch 120 may be preferably defined to be as short as possible, but the final limit switch 120 may not be arranged too close to the roof level of the top floor 108*a* so that the movement of the elevator car 102 is not stopped too easily, because it may reduce the availability of the elevators. FIG. 3*a* illustrates schematically an example of the operating distance of the final limit switch 120. FIG. 3*b* in turn illustrates schematically an example of the overtravel distance of the elevator car 102.

During the use of the elevator the elevator suspension means 110 elongates, which in turn causes that the overtravel distance decreases. Next one example for obtaining a value representing the overtravel distance is described. First the elevator car 102 that is empty is driven to the top floor 108*a* and the elevator is taken out of the normal operation. Furthermore, the final limit switch 120 is overcoupled in order to allow the elevator car pass the final limit switch 120 so that the final limit switch 120 does not stop the movement of the elevator car 102. Next the elevator car 102 is driven upwards with a reduced speed until the counterweight 112 reaches the buffer 122. The reduced speed may be for example less than 0.25 m/s. The overtravel distance corresponds to the distance travelled by the elevator car 102 upwards from the top floor 108 up to the detection of an indication that the counterweight 112 comes into a contact with the buffer 122. According to an embodiment of the invention a detection of a change in a torque of a hoisting motor indicates that the counterweight 112 reaches the buffer 122. The overtravel distance may be obtained for example with the elevator safety control unit 118. According to another embodiment of the invention a switch arranged to the buffer may be used to detect a movement of the buffer to indicate that the counterweight 112 reaches the buffer 122, i.e. comes into contact with the buffer 122. After obtaining the overtravel distance, the elevator car 102 is driven back to the top floor 108 and the elevator is returned back to the normal operation. The above described example is non-limiting example and the present invention is not limited to that. Thus, the overtravel distance may be obtained also by any other way. The overtravel distance may be obtained at regular or irregular intervals of time, i.e. the obtaining is repeated after a period of time.

As discussed above, the distance between the top of the elevator shaft 106 and the counterweight 112 may be measured when the counterweight locates at a predefined reference location, e.g. when the counterweight 112 makes contact with the buffer 122, to provide the value representing the settling of the elevator shaft 106. The above described procedures to detect an indication that the counterweight 112 comes into a contact with the buffer 122 may also be used to detect that the counterweight 112 locates at the reference location for the measurement of the distance between the top of the elevator shaft 106 and the counterweight 112 to provide the value representing the settling of the elevator shaft 106.

Alternatively or in addition, the operating distance of the final limit switch 120 may be obtained concurrently with the overtravel distance. A distance travelled by the elevator car 102 from the top floor 108*a* up to the operating point of the final limit switch 120 corresponds to the operating distance of the final limit switch 120. The operation distance of the final limit switch 120 does not change during the use of the elevator. Thus, the periodical monitoring of the operation distance of the final limit switch 120 is not needed similarly as the periodical monitoring of the overtravel distance. However, the operating distance of the final limit switch 120 may be obtained at least once after the installation of the elevator system in order to ensure that the final limit switch 120 is arranged, i.e. installed, at the intended operating position of the final limit switch. This enables that the actual operating distance of the final limit switch 120 may be obtained and verified after the installation of the elevator.

Figure 4:
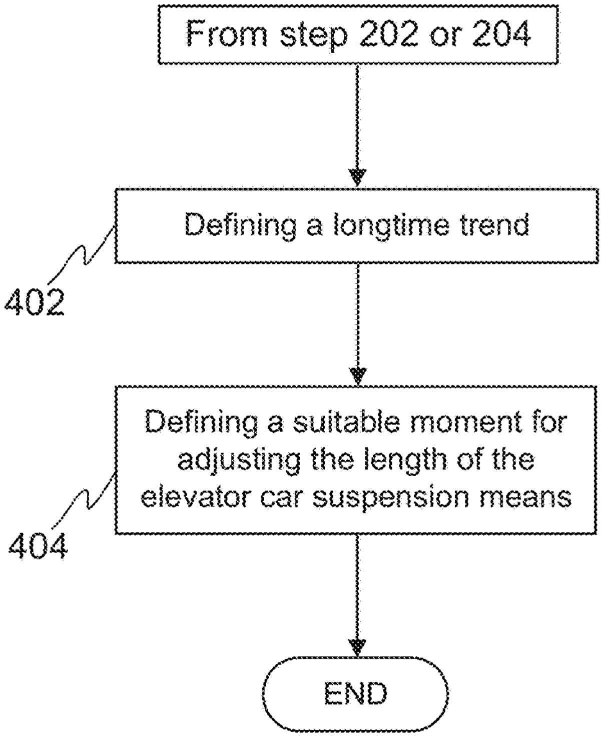
FIG. 4 illustrates schematically another example of the method according to the invention.

The method according to the invention may further enable defining a suitable moment for adjusting, i.e. shortening, the length of the elevator car suspension means. FIG. 4 schematically illustrates an example of the method according to the invention as a flow chart for defining a suitable moment for adjusting the length of the elevator car suspension means. After the step 202 or 204 the elevator safety control unit 118 may define 402 a longtime trend, i.e. gradual change, on a basis of the periodically obtained values representing the overtravel distance. An expectable behavior of the value representing the overtravel distance in future may be defined on the basis of the longtime trend. As described above the change of the overtravel distance may be considered to be substantially directly proportional to the elongation of the elevator car suspension means 110. Thus, by obtaining periodically the overtravel distance as function of time, the change of the overtravel distance and thus the elongation of the elevator car suspension means may be considered to be substantially constant and predictable until the condition of the elevator suspension means 110 deteriorate, i.e. the lifetime of the elevator car suspension means 110 approaches to the end. This enables that the longtime trend may be defined on a basis of the periodically obtained values representing the overtravel distance, which in turn enables that the overtravel distance and/or the elongation of the elevator car suspension means 110 in the future may be predicted substantially accurately. As described above, in case of newly build buildings the settling of the building causes also changes to the overtravel distance. Thus, the portion caused by the settling of the building needs to be removed from the obtained overtravel distance so that only the portion caused by the elongation of the elevator car suspension means 110 remains when defining the longtime trend. The elevator safety control unit 118 may define 404 a suitable moment for adjusting, i.e. shortening, the length of the elevator car suspension means 110 on a basis of the defined longtime trend.

Furthermore, the elevator safety control unit 118 may generate a control signal for the elevator service unit 119, wherein the control signal comprises at least the suitable moment for adjusting the length of the elevator car suspension means 110. In response to receiving the control signal the elevator service unit 119 may be configured to instruct maintenance personnel to adjust the length of the elevator car suspension means 110. After adjusting the length of the elevator car suspension means 110 the elevator car may be returned back to the normal operation.

Alternatively or in addition, if the safety control unit 118 communicates the obtained values to the elevator service unit 119 after the step 202 the elevator safety service unit 119 may perform the steps 402 and 404, i.e. define the longtime trend and the suitable moment for adjusting the length of the elevator car suspension means 110. In response to defining the suitable moment for adjusting the length of the elevator car suspension means 110 the elevator service unit 119 may be configured to instruct maintenance personnel to adjust the length of the elevator car suspension means 110. After adjusting the length of the elevator car suspension means 110 the elevator car may be returned back to the normal operation.

In addition the longtime trend may be defined on a basis of at least one elevator type specific parameter of said elevator together with the periodically obtained values representing the overtravel distance. The at least one elevator type specific parameter may be at least one of the following: operating distance of the final limit switch 120, travel height, suspension ratio of the elevator car suspension means 110, load, number of ropes, type of rope(s) or belt.

Figure 5:
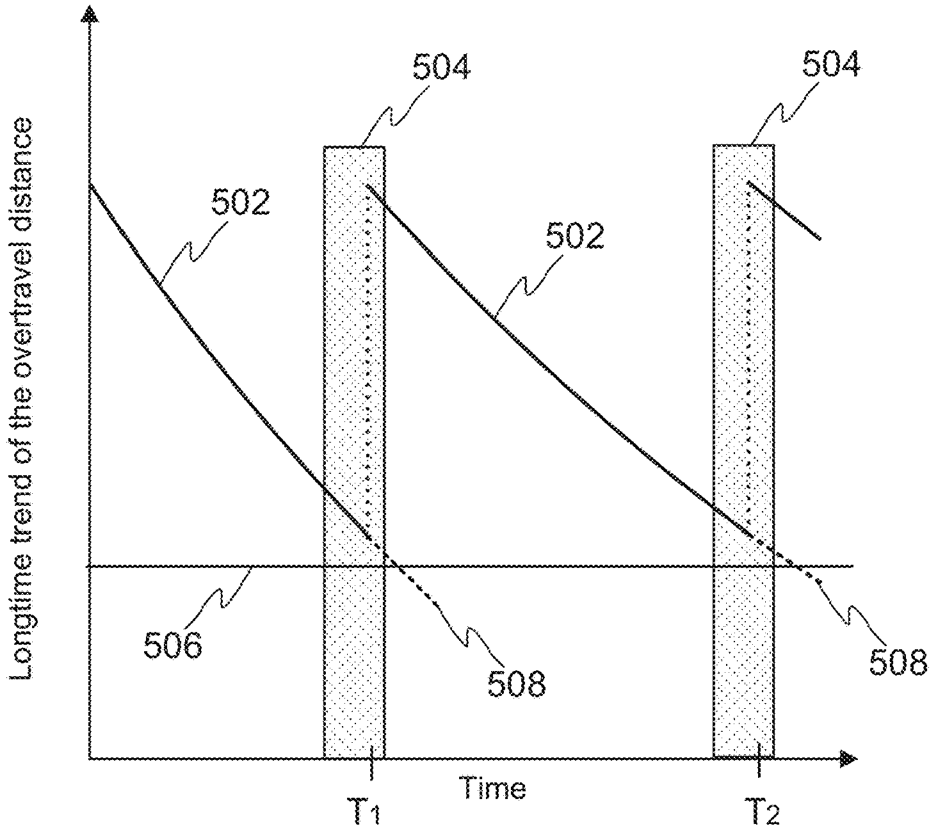
FIG. 5 illustrates schematically an example of defining a suitable moment for adjusting length of an elevator car suspension means according to the invention.

The suitable moment for adjusting the elevator car suspension means 110 may be defined on a basis of the defined longtime trend so that the suitable moment is sufficiently before the overtravel distance is predicted to meet, i.e. be equal to or less than, the operating distance of the final limit switch 120. FIG. 5 illustrates schematically an example of defining the suitable moment for adjusting the length of the elevator car suspension means 110 from the longtime trend. The longtime trend of the overtravel distance is illustrated with the curves 502. The longtime trend of the overtravel distance may be represented as the absolute values of the overtravel distance and/or as the rate of change of the overtravel distance. The suitable moment for adjusting the elevator car suspension means 110 may be for example one time instant or a time frame. In FIG. 5 the rectangles 504 represents the suitable time frames for adjusting the elevator car suspension means 110. The time frame 504 may be for example a couple of weeks or months. The time frames 504 may be such that maintenance personnel have enough time to adjust the length of the elevator car suspension means 110 before the elevator suspension means 110 elongates so that the overtravel distance may be predicted to meet, i.e. be equal to or less than, the operating distance of the final limit switch 120, which is illustrated in FIG. 5 with the line 506.

Preferably the suitable moment for adjusting the elevator car suspension means 110 is defined so that the unavailability of the elevators may be minimized. The time frame allows that the maintenance, i.e. adjusting the length of the elevator car suspension means 110, may be provided when it suits best for the users of the elevator and/or the maintenance personnel. In the example illustrated in FIG. 5 the length of the elevator car suspension means 110 is adjusted, i.e. shortened, at the time instant $T_1$. If the length of the elevator car suspension means 110 is not adjusted, the overtravel distance would meet the operating distance of the final limit switch 120 as illustrated with the dashed lines 508, which means that the overtravel distance is less than the operating distance of the final limit switch 120 and the elevator safety regulations are not fulfilled. After the adjustment of the length of the elevator car suspension means 110 the elevator safety control unit 118 continues the monitoring of the overtravel distance of the elevator car 102 and the longtime trend 502 may be defined again in order to define another suitable moment for adjusting the elevator car suspension means 110. In the example illustrated in FIG. 5 the length of the elevator car suspension means 110 is adjusted, i.e. shortened, again at a time instant $T_2$.

Figure 6:
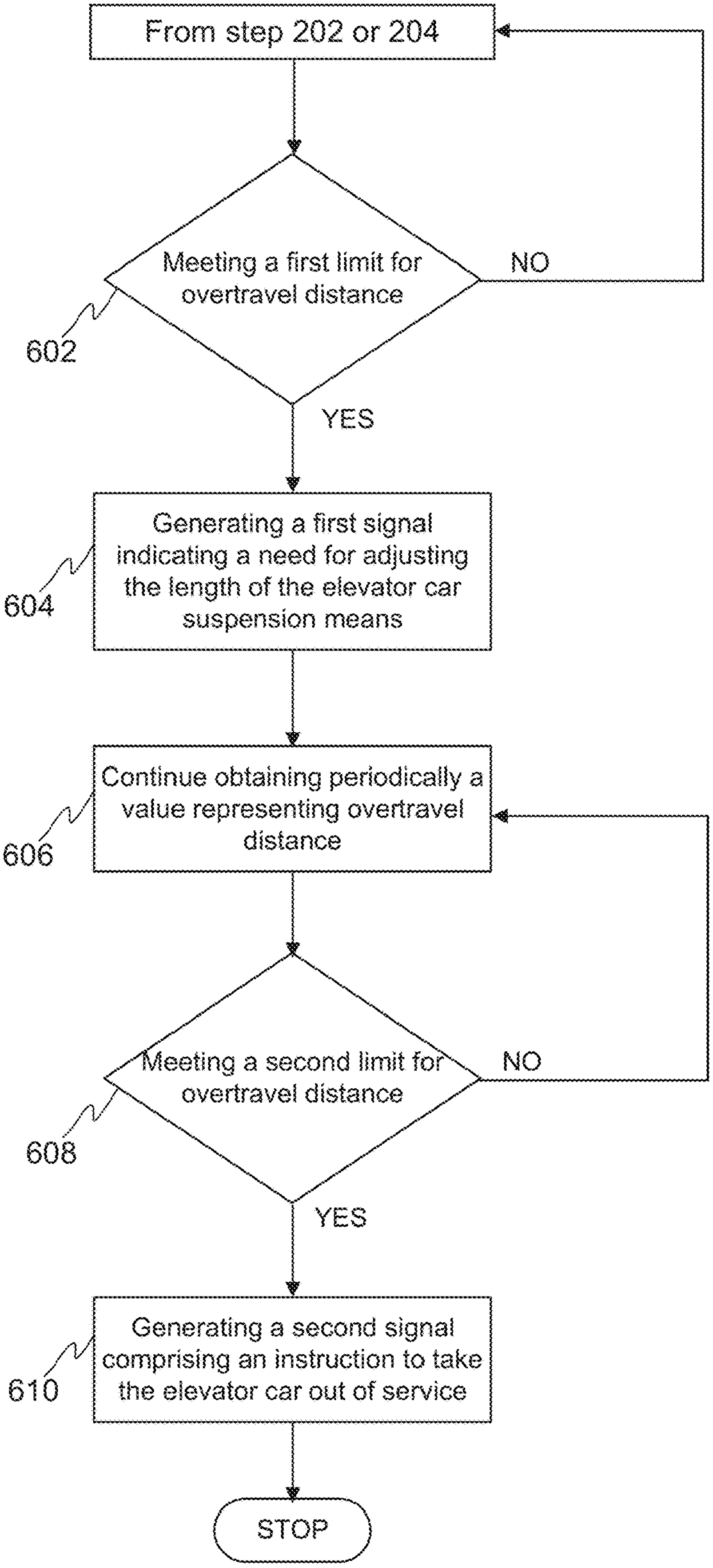
FIG. 6 illustrates schematically another example of the method according to the invention.

Next another example of the method according to the invention for defining a suitable moment for adjusting the length of the elevator car suspension means is described by referring to FIG. 6. FIG. 6 schematically illustrates the invention as a flow chart. The elevator safety control unit 118 may detect 602 that the periodically obtained value representing the overtravel distance meets a predefined first limit for the overtravel distance. In response to the detection the elevator safety control unit 118 may generate 604 a first signal indicating a need for adjusting, i.e. shortening, the length of the elevator car suspension means 110 for the elevator service unit 119. In response to receiving the first control signal the elevator service unit 119 may be configured to instruct maintenance personnel to adjust the length of the elevator car suspension means 110. The elevator safety control unit 119 may continue 606 obtaining periodically the overtravel distance of the elevator car 102. If the elevator safety control unit 118 detects 608 that the periodically obtained value representing the overtravel distance meets a predefined second limit for the overtravel distance before the length of the elevator car suspension 110 means is adjusted, the elevator safety control unit 118 may generate 610 a second signal comprising an instruction to take the elevator car 102 out of service for the elevator control unit 114. Additionally, the elevator safety control unit 118 may generate a third control signal indicating a need for adjusting the length of the elevator car suspension means 110 for the elevator service unit 119. In response to receiving the third control signal the elevator service unit 119 may be configured to instruct maintenance personnel to adjust the length of the elevator car suspension means 110. After adjusting the length of the elevator car suspension means 110 the elevator car may be returned back to the normal operation.

The predefined first limit for the overtravel distance is lower than the predefined second limit for the overtravel distance. The predefined first and second limits for the overtravel distance may be defined for example during the installation of the elevator system 100. The predefined second limit for the overtravel distance may be defined so that the elevator safety regulations are fulfilled, i.e. the overtravel distance is more than the operating distance of the final limit switch 120. Thus, the second limit for the overtravel distance may be defined to be the operating distance of the final limit switch 120. The predefined first limit for the overtravel distance may preferably be defined for example to be a certain percent, such as about 5-20 percent, of the predefined second limit. The suitable percent value for each suspension means 110 depends on the rate of change of the elongation of said elevator car suspension means 110. This enables that the maintenance personnel have enough time to adjust the length of the elevator car suspension means 110 before the elevator suspension means 110 elongates so that the overtravel distance meets the predefined second limit. For example the predefined first limit may be defined so that it allows a time frame of couple of months for example, for the maintenance personnel to adjust the length of the elevator car suspension means 110. Thus, it allows for the maintenance personnel to define a suitable moment for the adjusting the length of the elevator car suspension means 110 so that the unavailability of the elevators may be minimized. The time frame allows also that the maintenance, i.e. adjusting the length of the elevator car suspension means 110, may be provided when it suits best for the users of the elevator and/or the maintenance personnel.

Figure 7:
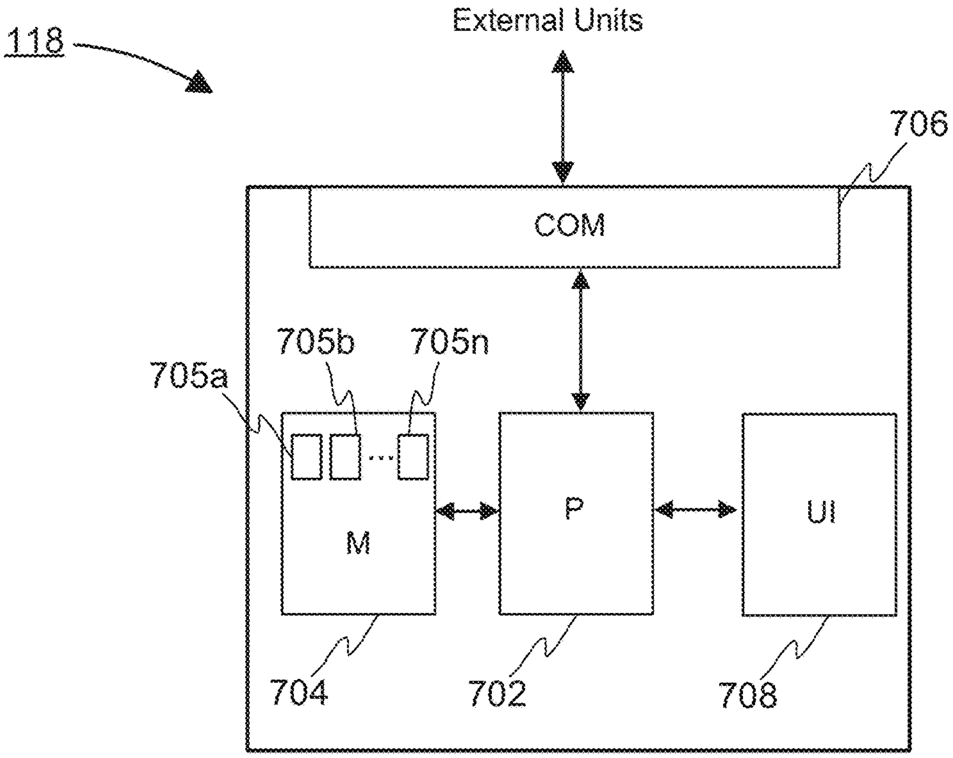
FIG. 7 illustrates schematically an example of an elevator safety control unit according to the invention.

FIG. 7 illustrates schematically an example of an elevator safety control unit 118 according to the invention. The elevator safety control unit 118 may comprise at least one processor 702, at least one memory 704, a communication interface 706, and one or more user interfaces 708. The at least one processor 702 may be any suitable for processing information and control the operation of the elevator safety control unit 118, among other tasks. The at least one processor 702 of the elevator safety unit 118 is at least configured to implement at least some method steps as described above. The at least one processor 702 of the elevator safety control unit 118 is thus arranged to access the at least one memory 704 and retrieve and store any information therefrom and thereto. The operations may also be implemented with a microcontroller solution with embedded software. The at least one memory 704 may be volatile or non-volatile. Moreover, the at least one memory 704 may be configured to store portions of computer program code 705*a*-705*n* and any data values. The at least one memory 704 is not limited to a certain type of memory only, but any memory type suitable for storing the described pieces of information may be applied in the context of the present invention. The communication interface 706 provides interface for communication with any external unit, such as with the elevator control unit 114, the elevator service unit 119 and/or any external systems. The communication interface 706 may be based on one or more known communication technologies, either wired or wireless, in order to exchange pieces of information as described earlier. The mentioned elements of the elevator safety unit 118 may be communicatively coupled to each other with e.g. an internal bus.

Figure 8:
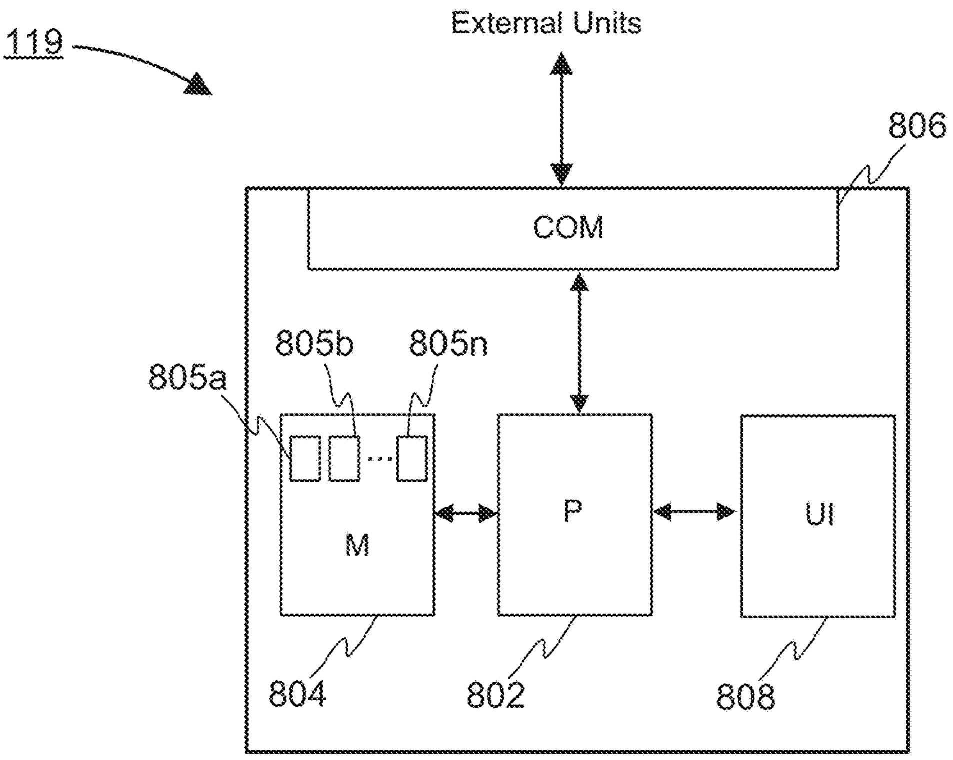
FIG. 8 illustrates schematically an example of an elevator service unit according to the invention.

FIG. 8 illustrates schematically an example of an elevator service unit 119 according to the invention. The elevator service unit 119 may comprise at least one processor 802, at least one memory 804, a communication interface 806, and one or more user interfaces 808. The at least one processor 802 may be any suitable for processing information and control the operation of the elevator service unit 119, among other tasks. The at least one processor 802 of the service unit 119 is at least configured to implement at least some method steps as described above. The at least one processor 802 of the elevator service unit 119 is thus arranged to access the at least one memory 804 and retrieve and store any information therefrom and thereto. The operations may also be implemented with a microcontroller solution with embedded software. The at least one memory 804 may be volatile or non-volatile. Moreover, the at least one memory 804 may be configured to store portions of computer program code 805*a*-805*n* and any data values. The at least one memory 804 is not limited to a certain type of memory only, but any memory type suitable for storing the described pieces of information may be applied in the context of the present invention. The communication interface 806 provides interface for communication with any external unit, such as with the elevator control unit 114, the elevator safety control unit 118 and/or any external systems. The communication interface 806 may be based on one or more known communication technologies, either wired or wireless, in order to exchange pieces of information as described earlier. The user interface 808 may be configured to input control commands, receive information, and/or instructions, and to display information. The user interface 808 may comprise at least one of the following: at least one function key, touchscreen, keyboard, mouse, pen, display, printer, speaker. The mentioned elements of the elevator service 119 may be communicatively coupled to each other with e.g. an internal bus.

The present invention as hereby described provides great advantages over the prior art solutions. For example, the present invention improves at least partly the safety of the elevators. Furthermore, the present invention enables a method for a condition-based maintenance. The present invention enables further an automated method for defining the elongation of the elevator car suspension means. Moreover, the present invention may enable further an automated method for defining a need and/or a suitable moment for adjusting, i.e. shortening, the length of the elevator car suspension means. This also allows that the monitoring of a condition of the elevator car suspension means may be performed remotely. Furthermore, the present invention may allow that the need and/or suitable moment for maintenance, i.e. for adjusting the length of the elevator car suspension means, may be provided in advance before the operation of the elevator car is stopped. Thus, the availability of the elevators may be at least partly improved, because less maintenance breaks for performing condition inspections for the elevator car suspension means are needed.

Moreover, the present invention may enable the implementation of defining elongation the elevator car suspension means and/or a need and/or a suitable moment for adjusting the length of the elevator car suspension means a by using already existing components of the elevator system. Thus, additional expensive components are not needed. The use of already existing components of the elevator system 200 that meet good Safety Integrity Level (SIL) accuracy requirements enables that defining elongation the elevator car suspension means and/or a need and/or a suitable moment for adjusting the length of the elevator car suspension means may be defined so that good SIL accuracy requirements are met. SIL may be used to indicate a tolerable failure rate of a particular safety function, for example a safety component. SIL is defined as a relative level of risk-reduction provided by the safety function, or to specify a target level of risk reduction. SIL has a number scheme from 1 to 4 to represent its levels. The higher the SIL level is, the greater the impact of a failure is and the lower the failure rate that is acceptable is.

The term "normal operation" of an elevator is used in this patent application to mean the operation of the elevator, wherein the elevator car is configured to drive in the elevator shaft between floors in order to serve passengers and/or to carry loads. The normal operation of the elevator covers also the time periods, when the elevator car is configured to wait at a floor an instruction to move to another floor.

The term "door zone" is used in this patent application to mean a zone extending from a lower limit below floor level to an upper limit above the floor level in which a landing door and an elevator car door are in mesh and operable. The door zone may be determined to be from −400 mm to +400 mm for example. Preferably, the door zone may be from −150 mm to +150 mm. When arriving to the door zone the elevator car is allowed to begin to open the doors even before the elevator car is stopped.

The verb "meet" in context of a limit is used in this patent application to mean that a predefined condition is fulfilled. For example, the predefined condition may be that the limit for overtravel distance is reached and/or exceeded.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. A method for defining elongation of an elevator car suspension device configured to suspend an elevator car and a counterweight in an elevator shaft, the method comprising:
  periodically obtaining a value representing an overtravel distance of the elevator car, to thus obtain a plurality of periodically obtained values representing the overtravel distance of the elevator car,
  defining the elongation of the elevator car suspension device, based on the plurality of periodically obtained values representing the overtravel distance of the elevator car, defining a longtime trend of the overtravel distance based on the plurality of periodically obtained values representing the overtravel distance, and
  defining a particular time frame during which a length of the elevator car suspension device is to be adjusted, based on the defined longtime trend,
  wherein each periodically obtained value representing the overtravel distance is obtained by
    overcoupling a final limit switch coupled to the elevator shaft above a top floor of a plurality of floors in the elevator shaft,
    driving the elevator car upwards from the top floor until the counterweight comes into contact with a buffer at a bottom of the elevator shaft, and
    determining a distance travelled by the elevator car from the top floor up to a position in the elevator shaft that corresponds to detection of an indication that the counterweight comes into contact with the buffer,
    wherein the distance corresponds to the overtravel distance of the elevator car, and
  wherein the indication that the counterweight comes into contact with the buffer is detected based on
    detection of a change in a torque of a hoisting motor of a hoisting machine configured to drive the elevator car, or
    detection of a movement of the buffer via operation of a switch coupled to the buffer.

2. The method according to claim 1, further comprising:
  defining the longtime trend based on at least one elevator type specific parameter together with the plurality of periodically obtained values representing the overtravel distance,
  wherein the at least one elevator type specific parameter is at least one of an operating distance of the final limit switch, a travel height, a suspension ratio, a load, a quantity of ropes, or a type of ropes.

3. The method according to claim 1, further comprising:
  generating a first signal indicating a need to adjust the length of the elevator car suspension device, in response to a detection that a particular obtained value representing the overtravel distance meets a particular first limit value associated with the overtravel distance, the first signal to be transmitted to an elevator service device.

4. The method according to claim 3, further comprising:
  generating a second signal that includes an instruction to take the elevator car out of service, in response to a detection that another obtained value representing the overtravel distance meets a particular second limit value associated with the overtravel distance, the second signal to be transmitted to an elevator control device.

5. The method according to claim 1, further comprising:
  periodically obtaining a value representing settling of the elevator shaft, to thus obtain a plurality of periodically obtained values representing the settling of the elevator shaft; and
  defining the elongation of the elevator car suspension device based on both the plurality of periodically obtained values representing the overtravel distance of the elevator car and the plurality of periodically obtained values representing the settling of the elevator shaft,
  wherein each periodically obtained value representing the settling of the elevator shaft is obtained by measuring a distance between a top of the elevator shaft and the counterweight via a long-range distance meter concurrently with the counterweight being located at a particular reference location.

6. The method according to claim 1, further comprising:
  obtaining an operating distance of the final limit switch to verify an actual operating position of the final limit switch.

7. An elevator system, comprising:
  an elevator car;
  an elevator car suspension device configured to suspend the elevator car and a counterweight in an elevator shaft;
  an elevator service device; and
  an elevator safety control device,
  wherein the elevator safety control device is configured to periodically obtain a value representing an overtravel distance of the elevator car, to thus obtain a plurality of periodically obtained values representing the overtravel distance of the elevator car,
  wherein the elevator safety control device or the elevator service device is configured to define elongation of the elevator car suspension device based on the plurality of periodically obtained values representing the overtravel distance of the elevator car, wherein the elevator safety control device or the elevator service device is further configured to define a longtime trend of the overtravel distance based on the plurality of periodically obtained values representing the overtravel distance, and define a particular time frame during which a length of the elevator car suspension device is to be adjusted, based on the defined longtime trend, wherein each periodically obtained value representing the overtravel distance is obtained by overcoupling a final limit switch arranged to the elevator shaft above a top floor of a plurality of floors in the elevator shaft, driving the elevator car upwards from the top floor until the counterweight comes into contact with a buffer at a bottom of the elevator shaft, and determining a distance travelled by the elevator car from the top floor up to a position in the elevator shaft that corresponds to detection of an indication that the counterweight comes into contact with the buffer, wherein the distance corresponds to the overtravel distance of the elevator car, and wherein the indication that the counterweight comes into contact with the buffer is detected based on detection of a change in a torque of a hoisting motor of a hoisting machine configured to drive the elevator car, or detection of a movement of the buffer via a switch coupled to the buffer.

8. The elevator system according to claim 7, wherein the elevator safety control device or the elevator service device is further configured to define the longtime trend based on at least one elevator type specific parameter together with the plurality of periodically obtained values representing the overtravel distance, and the at least one elevator type specific parameter is at least one of an operating distance of the final limit switch, a travel height, a suspension ratio, a load, a quantity of ropes, or a type of ropes.

9. The elevator system according to claim 7, wherein the elevator safety control device is configured to generate a first signal indicating a need to adjust the length of the elevator car suspension device, in response to a detection that a particular obtained value representing the overtravel distance meets a particular first limit value associated with the overtravel distance.

10. The elevator system according to claim 9, wherein the elevator safety control device is further configured to generate a second signal that includes an instruction to an elevator control device to take the elevator car out of service, in response to a detection that another obtained value representing the overtravel distance meets a particular second limit value associated with the overtravel distance.

11. The elevator system according to claim 7, wherein the elevator safety control device is further configured to periodically obtain a value representing settling of the elevator shaft, to thus obtain a plurality of periodically obtained values representing the settling of the elevator shaft, the elevator safety control device or the elevator service device is configured to define the elongation of the elevator car suspension device on based on both the plurality of periodically obtained values representing the overtravel distance of the elevator car and the plurality of periodically obtained values representing the settling of the elevator shaft, and the elevator system further includes a long-range distance meter coupled to a top of the elevator shaft and configured to provide each periodically obtained value representing the settling of the elevator shaft by measuring a distance between the top of the elevator shaft and the counterweight concurrently with the counterweight being located at a particular reference location.

12. The elevator system according to claim 7, wherein the elevator safety control device is further configured to obtain an operating distance of the final limit switch to verify an actual operating position of the final limit switch.

13. The method of claim 1, further comprising:

generating a control signal to provide an indication that the length of the elevator car suspension device needs to be adjusted, based on the defined elongation of the elevator car suspension device.

14. The method of claim 1, further comprising:

adjusting the length of the elevator car suspension device based on the defined elongation of the elevator car suspension device, so that the counterweight is configured to be a particular overtravel distance from the buffer when the elevator car is at the top floor.

15. The method of claim 1, further comprising:

taking the elevator car out of service based on the defined elongation of the elevator car suspension device.

16. The elevator system of claim 7, wherein the elevator safety control device or the elevator service device is configured generate a signal to cause an instruction to adjust the length of the elevator car suspension device to be provided, based on the defined elongation of the elevator car suspension device, to cause the counterweight to be configured to be a particular overtravel distance from the buffer when the elevator car is at the top floor.

17. The elevator system of claim 7, further comprising:

an elevator control device configured to control operation of the elevator system, the elevator safety control device or the elevator service device is configured to generate a signal to the elevator control device that includes an instruction to take the elevator car out of service, based on the defined elongation of the elevator car suspension device.

18. A control device for an elevator system, the elevator system including an elevator car, a counterweight, and an elevator car suspension device configured to suspend the elevator car and the counterweight in an elevator shaft, the control device comprising:

a memory storing computer program code; and a processor configured to execute the computer program code to perform a method, the method comprising:

periodically obtaining a value representing an overtravel distance of the elevator car, to thus obtain a plurality of periodically obtained values representing the overtravel distance of the elevator car, and defining an elongation of the elevator car suspension device, based on the plurality of periodically obtained values representing the overtravel distance of the elevator car, selectively transmitting one or more signals, based on the defined elongation of the elevator car suspension device, to cause an instruction to adjust a length of the elevator car suspension device to be provided, and/or provide an instruction to cause the elevator car to be taken out of service, defining a longtime trend of the overtravel distance based on the plurality of periodically obtained values representing the overtravel distance, and defining a particular time frame during which a length of the elevator car suspension device is to be adjusted, based on the defined longtime trend, wherein each periodically obtained value representing the overtravel distance is obtained by overcoupling a final limit switch coupled to the elevator shaft above a top floor of a plurality of floors in the elevator shaft, driving the elevator car upwards from the top floor until the counterweight comes into contact with a buffer at a bottom of the elevator shaft, and determining a distance travelled by the elevator car from the top floor up to a position in the elevator shaft that corresponds to detection of an indication that the counterweight comes into contact with the buffer, wherein the distance corresponds to the overtravel distance of the elevator car, and wherein the indication that the counterweight comes into contact with the buffer is detected based on detection of a change in a torque of a hoisting motor of a hoisting machine configured to drive the elevator car, or detection of a movement of the buffer via operation of a switch coupled to the buffer.

* * * * *